(12) United States Patent
Chang et al.

(10) Patent No.: US 7,589,675 B2
(45) Date of Patent: Sep. 15, 2009

(54) BROADBAND ANTENNA

(75) Inventors: Chih-Chen Chang, Banciao (TW); Yung-Chin Lo, Pusin Township, Changhua County (TW)

(73) Assignee: Industrial Technology Research Institute, Hsinchu (TW)

( * ) Notice: Subject to any disclaimer, the term of this patent is extended or adjusted under 35 U.S.C. 154(b) by 286 days.

(21) Appl. No.: 11/523,658

(22) Filed: Sep. 20, 2006

(65) Prior Publication Data
US 2007/0290928 A1     Dec. 20, 2007

Related U.S. Application Data

(60) Provisional application No. 60/801,382, filed on May 19, 2006.

(51) Int. Cl.
*H01Q 1/38*     (2006.01)
(52) U.S. Cl. ............... 343/700 MS; 343/866; 340/572.1
(58) Field of Classification Search .......... 343/700 MS, 343/866
See application file for complete search history.

(56) References Cited

U.S. PATENT DOCUMENTS 6,697,025 B2 *   2/2004   Koyanagi et al. .......... 343/741
2001/0007335 A1 *   7/2001   Tuttle et al. ............... 235/492
2002/0011967 A1 *   1/2002   Goff et al. ................. 343/895
2005/0024287 A1     2/2005   Jo et al.
2007/0182658 A1 *   8/2007   Ozden ....................... 343/866

FOREIGN PATENT DOCUMENTS

| DE | 19516227 A1 | 11/1996 |
|---|---|---|
| JP | 05-063425 A | 3/1993 |
| JP | 2002-522999 A | 7/2002 |
| KR | 2006-00064454 | 6/2006 |
| TW | 301476 | 3/1997 |
| TW | 347918 | 12/1998 |
| TW | 200540722 | 12/2005 |
| TW | I255068 | 5/2006 |
| WO | WO-03/096478 | 11/2003 |

OTHER PUBLICATIONS

Cho, C. et al., "Broadband RFID tag antenna with quasi-isotropic radiation pattern", Electronics Letters, vol. 41, No. 20, Sep. 29, 2005, pp. 1091-1092.

* cited by examiner

*Primary Examiner*—Trinh V Dinh
*Assistant Examiner*—Dieu Hien T Duong
(74) *Attorney, Agent, or Firm*—Rabin & Berdo, P.C.

(57) ABSTRACT

A broadband antenna includes a coupling loop and a number of radiation bodies. The coupling loop is electrically coupled to a chip and the chip records several pieces of data. The radiation bodies respectively form a number of resonance loops with the coupling loop for providing a number of resonance frequencies of the broadband antenna. The coupling loop can feed in signals for reading data in the chip according to the resonance frequencies.

4 Claims, 7 Drawing Sheets

BROADBAND ANTENNA

This application claims the benefit of U.S. provisional application Ser. No. 60/801,382, filed May 19, 2006, the subject matter of which is incorporated herein by reference.

BACKGROUND OF THE INVENTION

1. Field of the Invention

The invention relates in general to a broadband antenna, and more particularly to a broadband antenna which can enlarge antenna bandwidth by a multi-coupling feed-in mechanism.

2. Description of the Related Art

For example, a radio frequency identification (RFID) system transmits identification information by radio waves such that users can obtain the required information by a wireless way. The RFID system is composed of several RFID tags and a reader. Each RFID tag stores the corresponding identification information, such as product names, sources of goods, or purchase dates for product management.

The RFID tag performs data transmission with the reader by using a tag antenna and a tag chip, and whether the RFID tag can efficiently receive energy outputted from the reader determines a read distance between the reader and tag. Therefore, it is a main point in tag antenna design whether the tag antenna and tag chip can have impedance match in order to efficiently receive the energy outputted from the reader. However, owing that the tag chip usually has high capacitive reactance, in order to have conjugate match with the tag chip, the tag antenna is also designed to have high inductive reactance. As a result, an issue of too narrow bandwidth is occurred on the tag antenna. Therefore, a broadband antenna is very important in application of the RFID system.

Besides, the RFID tag chip has impedance variation due to semiconductor process variation, and also varies its impedance as attached to objects of different material, and all the impedance variation needs to be compensated in design of a tag antenna.

SUMMARY OF THE INVENTION

The invention provides a broadband antenna which can perform a multi-coupling feed-in operation by using several radiation bodies to enlarge antenna bandwidth and improve a read distance between the reader and tag.

The invention provides a broadband antenna including a coupling loop, a first radiation body and a second radiation body. The coupling loop has a first feed-in terminal and a second feed-in terminal. The first radiation body forms a first resonance loop with the coupling loop for providing a first resonance frequency of the broadband antenna. The second radiation body forms a second resonance loop with the coupling loop for providing a second resonance frequency of the broadband antenna. The coupling loop can feed in signals according to the first resonance frequency and the second resonance frequency.

The invention provides a broadband antenna including a coupling loop and more than two radiation bodies. The coupling loop has a first feed-in terminal and a second feed-in terminal. The radiation bodies respectively form a number of resonance loops with the coupling loop for providing a number of resonance frequencies of the broadband antenna. The coupling loop can feed in signals according to the resonance frequencies.

Advantages of the invention will become apparent from the following detailed description of the preferred but non-limiting embodiments. The following description is made with reference to the accompanying drawings.

DETAILED DESCRIPTION OF THE INVENTION

The invention provides a broadband antenna which can have several resonance frequencies by performing a multi-coupling feed-in operation via a number of radiation bodies. Therefore, the broadband antenna can have larger bandwidth and thus the reader can increase its read distance. Although a broadband tag antenna is taken as an example for the broadband antenna in the following embodiment, the invention is not limited thereto.

Figure 1:
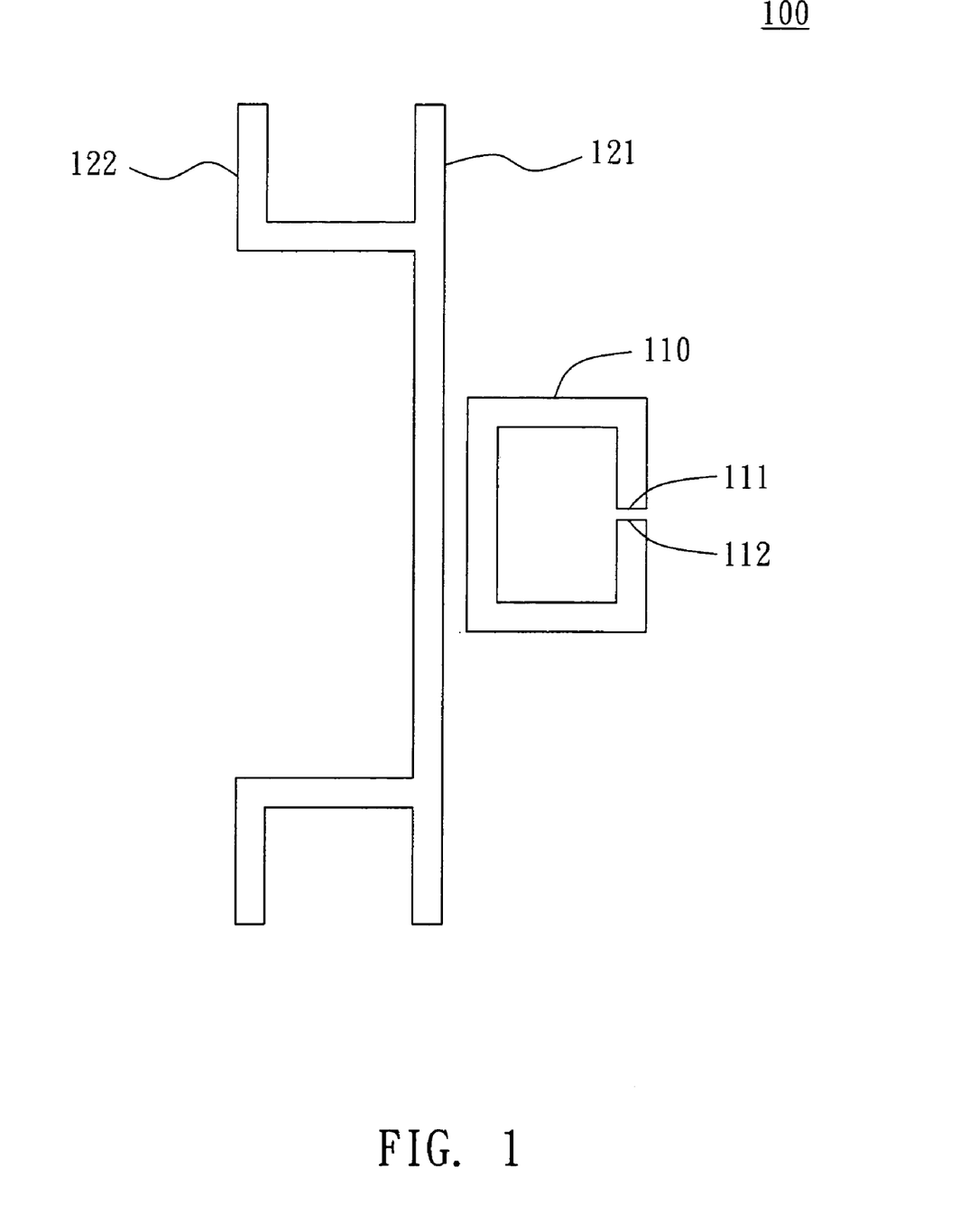
FIG. 1 is a schematic diagram of a broadband antenna according to a preferred embodiment of the invention.

Referring to FIG. 1, a schematic diagram of a broadband antenna according to a preferred embodiment of the invention is shown. The broadband antenna 100 includes a coupling loop 110 and radiation bodies 121 and 122. The coupling loop 110 has a first feed-in terminal 111 and a second feed-in terminal 112, and a chip (not shown in the figure) is usually electrically coupled between the first feed-in terminal 111 and the second feed-in terminal 112. As shown in FIG. 1, the radiation body 121 is a main body and the radiation body 122 includes two L-shaped bodies respective symmetrically attached to two ends of the radiation body 121 as branches. However, the shape and connection relationship of the radiation bodies 121 and 122 in the invention are not limited thereto.

The radiation bodies 121 and 122 respectively form two resonance loops with the coupling loop 110 for providing two resonance frequencies of the broadband antenna 100. Because the length of the radiation body 121 is smaller than that of the radiation body 122, the resonance loop formed by the radiation body 121 has a higher resonance frequency than that formed by the radiation body 122. Owing that the radiation bodies 121 and 122 are both coupled to the coupling loop 110 and the difference of the radiation bodies 121 and 122 in length is not large, the resonance frequencies generated by the radiation bodies 121 and 122 are close. In other words, compared to the resonance frequency (such as a central frequency of 915 MHz or 2.45 GHz) generated by a single radiation body, the two resonance frequencies generated by the radiation bodies 121 and 122 are those near to the central frequency, thereby increasing antenna bandwidth of the broadband antenna 100. For example, the invention is applied to a tag antenna. When the RFID tag antenna varies its impedance as attached to objects of different material, due to the feature of larger antenna bandwidth, the coupling loop 110 can still feed in RF signals transmitted from the reader for reading a tag chip.

Figure 2:
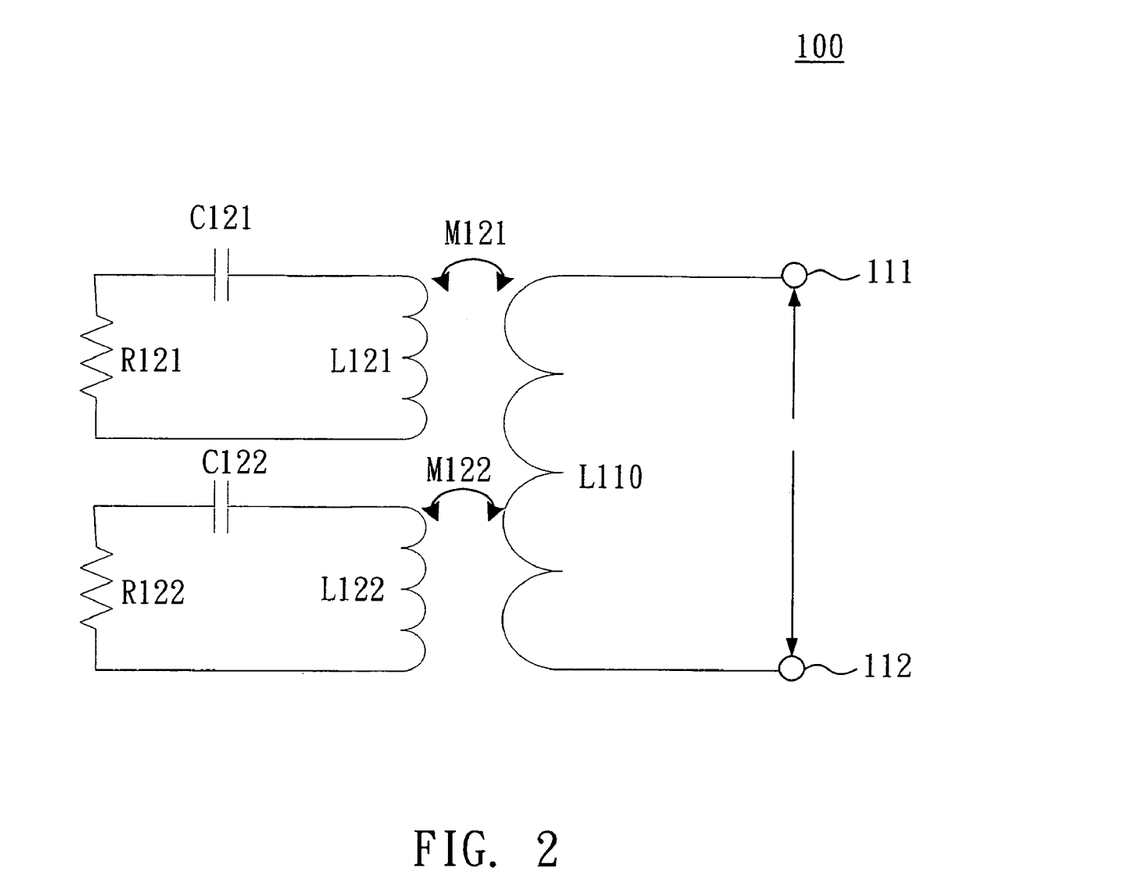
FIG. 2 is an equivalent circuit diagram of the broadband antenna according to the preferred embodiment of the invention.

Referring to FIG. 2, an equivalent circuit diagram of the broadband antenna according to the preferred embodiment of the invention is shown. The first feed-in terminal 111 and the second feed-in terminal 112 of the broadband antenna 100 are located at a first side of a transformer, and the radiation bodies 121 and 122 are located at a second side of the transformer. The coupling loop 110 has an inductance L110. The equivalent circuit of the radiation body 121 is defined by a resistor R121, a capacitor C121 and an inductance L121, and the equivalent circuit of the radiation body 122 is defined by a resistor R122, a capacitor C122 and an inductance L122. A coupling amount of the coupling loop 110 and radiation body 121 is defined by M121, and a coupling amount of the coupling loop 110 and radiation body 122 is defined by M122. The impedance match of the broadband antenna 100 and the chip can be achieved by adjusting the coupling amounts M121 and M122.

Figure 3:
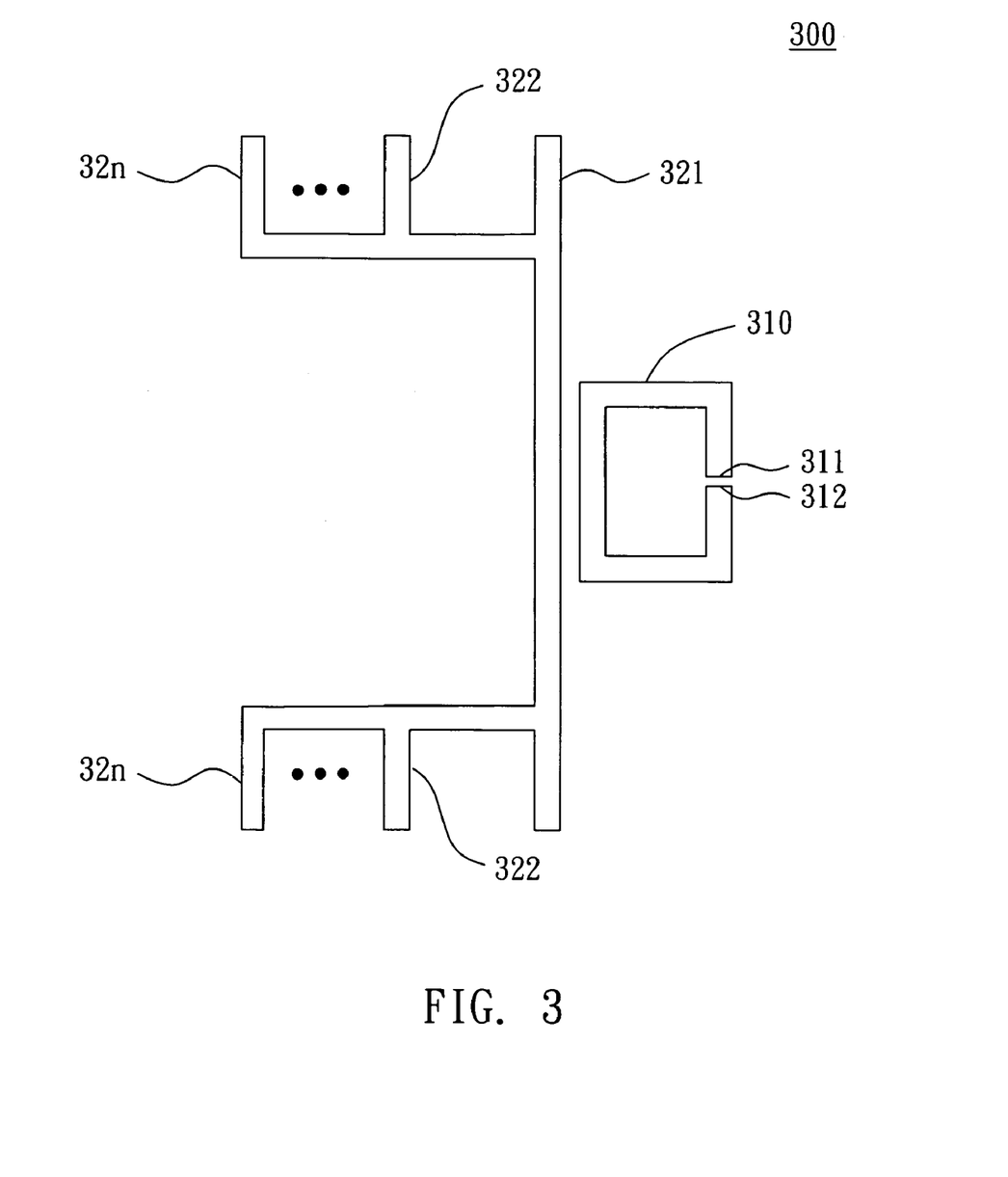
FIG. 3 is a schematic diagram of a second broadband antenna according to the preferred embodiment of the invention.

The broadband antenna disclosed by the above-mentioned embodiment of the invention is not limited to having only two radiation bodies, and can have more than two radiation bodies for receiving RF signals with larger bandwidth. Referring to FIG. 3, a schematic diagram of a second broadband antenna according to the preferred embodiment of the invention is shown. The broadband antenna 300 includes a coupling loop 310 and several radiation bodies 321~32n. For example, the radiation body 321 is a main body, and the other radiation bodies 322~32n are connected in series to each other and form two brush-shaped bodies symmetrically connected to two ends of the radiation body 321 as branches. Each of the radiation bodies 322~32n includes two L-shaped bodies as shown in FIG. 3. The coupling loop 310 has a first feed-in terminal 311 and a second feed-in terminal 312. A chip (not shown in the figure) is usually electrically coupled between the first feed-in terminal 311 and the second feed-in terminal 312. The broadband antenna 300 has a similar operation principle as the broadband antenna 100, and the difference of the two antennas 300 and 100 lies in that the broadband antenna 300 has more resonance frequencies near to the central frequency and thus has even larger antenna bandwidth.

Figure 4:
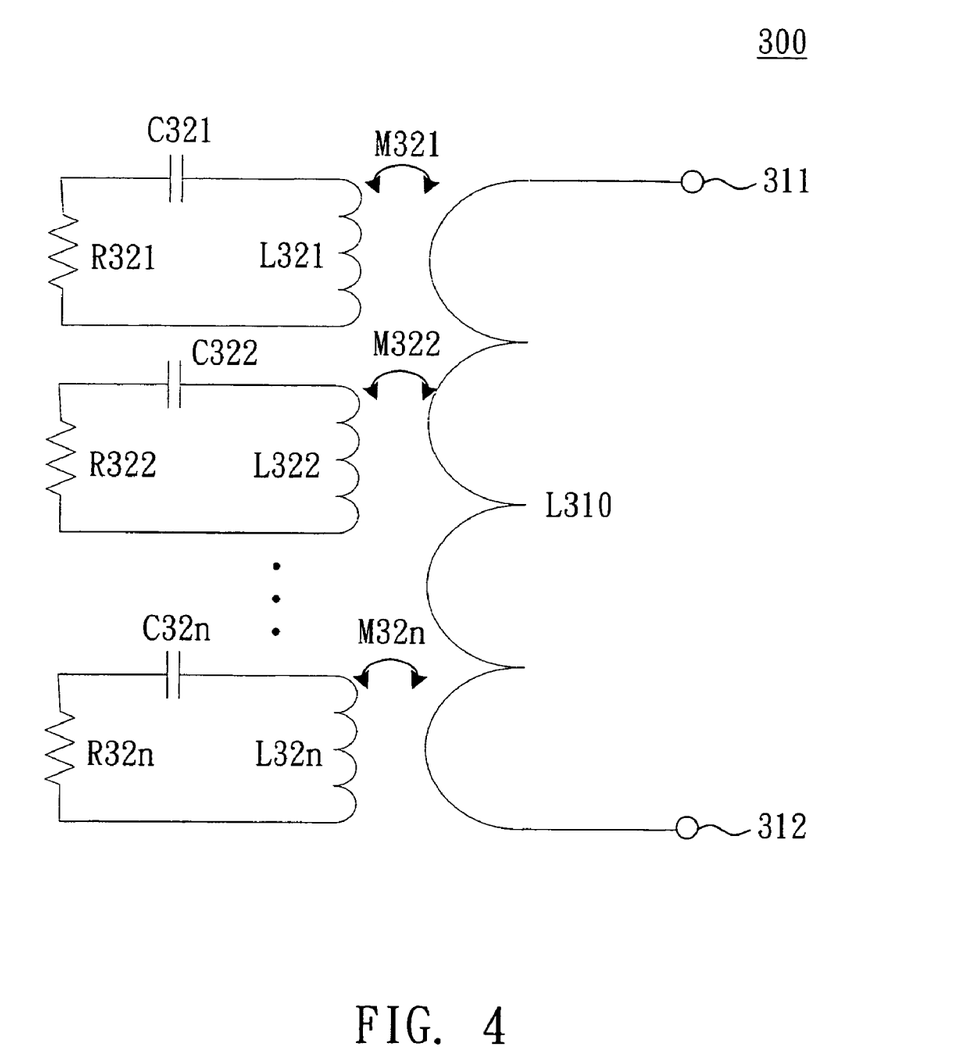
FIG. 4 is an equivalent circuit diagram of the broadband antenna in FIG. 3.

Referring to FIG. 4, an equivalent circuit diagram of the broadband antenna 300 in FIG. 3 is shown. The first feed-in terminal 311 and the second feed-in terminal 312 of the broadband antenna 300 are located at a first side of a transformer and the radiation bodies 321~32n are located at a second side of the transformer. The coupling loop 310 has an inductance L310. The equivalent circuit of the radiation body 32$x$ (x=1~n) is defined by a resistor R32$x$, a capacitor C32$x$ and an inductance L32$x$ and the coupling amount of the coupling loop 310 and the radiation body 32$x$ (x=1~n) is defined by M32$x$. The impedance conjugate match of the broadband antenna 300 and the chip can be achieved by adjusting the coupling amounts M32$x$ (x=1~n).

Figure 5:
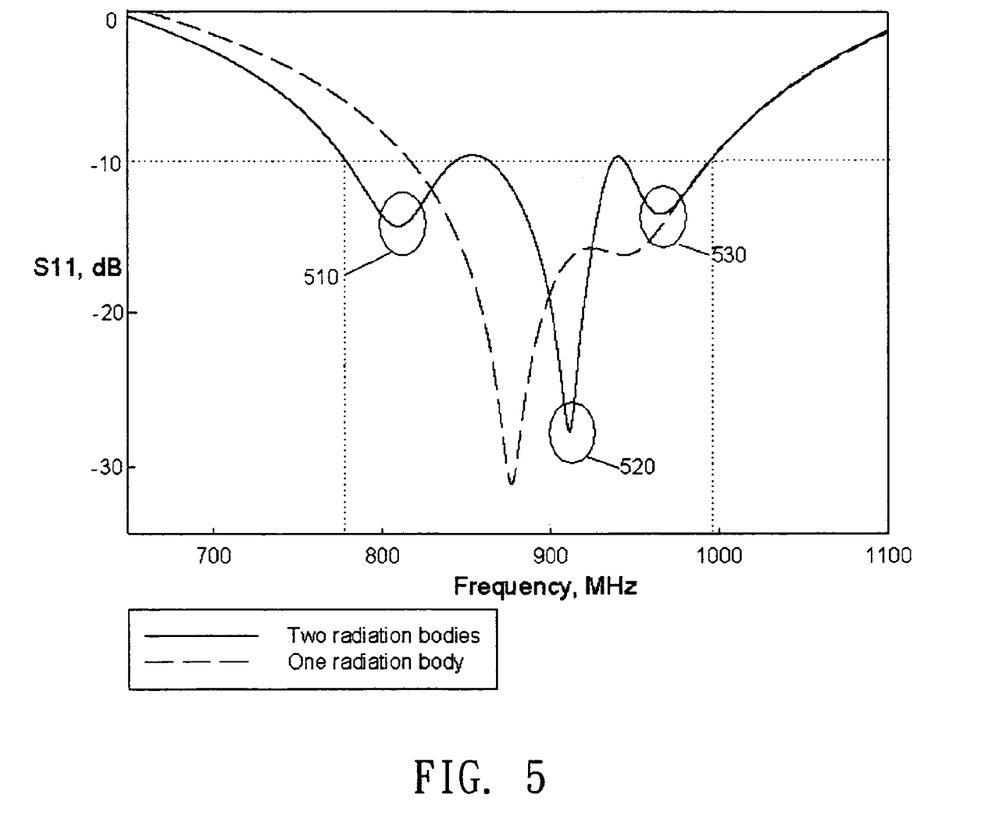
FIG. 5 is a measure diagram of return loss of the broadband antenna.

Referring to FIG. 5, a measure diagram of return loss of the broadband antenna 100 is shown. From FIG. 5, it can be seen that the −10 dB bandwidth of the broadband antenna 100 with the central frequency 915 MHz is about 780~1000 MHz. Therefore, the broadband antenna 100 having radiation bodies 121 and 122 can have larger bandwidth near the central frequency than the broadband antenna having a single radiation body. Besides, the resonance frequencies generated by the broadband antenna 100 can meet the requirement of every country in a RF band. For example, the broadband antenna 100 can provide a RF band near 510 applied in Europe, a RF band near 520 applied in Taiwan and USA, and a RF band near 530 applied in Japan with lowest return loss.

Figure 6:
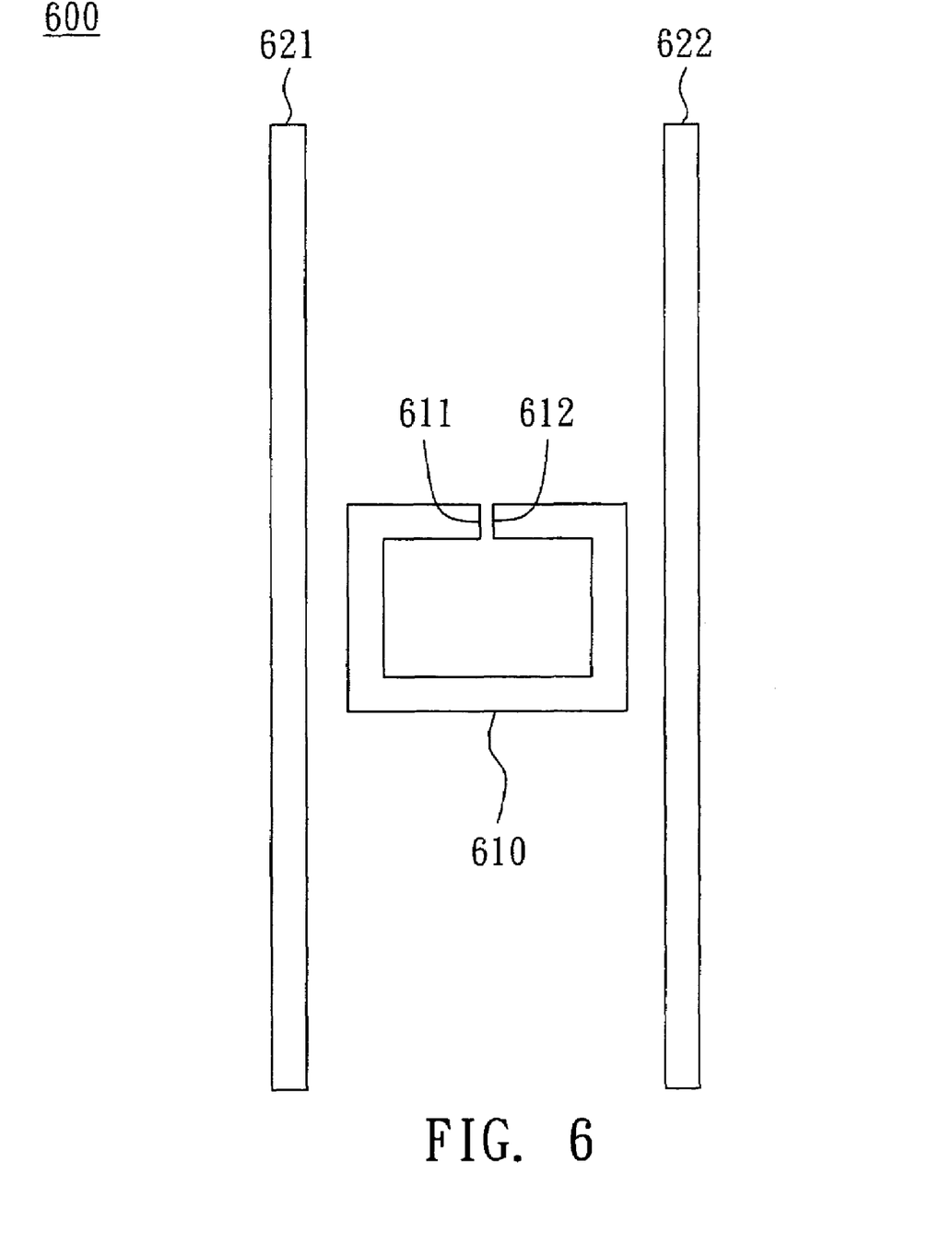
FIG. 6 is a schematic diagram of a third broadband antenna according to the preferred embodiment of the invention.

Furthermore, in the broadband antenna disclosed by the above-mentioned embodiment of the invention, the coupling loop can be separated from or connected to the radiation bodies. The radiation bodies can be antennas of an arbitrary type, that is, any type of antenna can improve its bandwidth according to the embodiment of the invention. In addition, the radiation bodies can be separated from each other and are not limited to coupling with each other. Referring to FIG. 6, a schematic diagram of a third broadband antenna according to the preferred embodiment of the invention is shown. The broadband antenna 600 includes a coupling loop 610, and radiation bodies 621 and 622. The coupling loop 610 has a first feed-in terminal 611 and a second feed-in terminal 612. A chip (not shown in the figure) is usually electrically coupled between the first feed-in terminal 611 and the second feed-in terminal 612. The radiation bodies 621 and 622 are respectively disposed in parallel at two opposite sides of the coupling loop 610, and form two resonance loops with the coupling loop 610 for providing two resonance frequencies of the broadband antenna 600. Accordingly, the broadband antenna 600 can feed in signals of larger bandwidth.

The broadband antenna disclosed by the above-mentioned embodiment of the invention performs a multi-coupling feed-in operation by using several radiation bodies to generate a number of resonance frequencies near the central frequency. Therefore, the broadband antenna can have larger bandwidth for making impedance conjugate match with the chip and receive RF signals of larger bandwidth from the chip, thereby increasing a read distance between the reader and tag.

Figure 7:
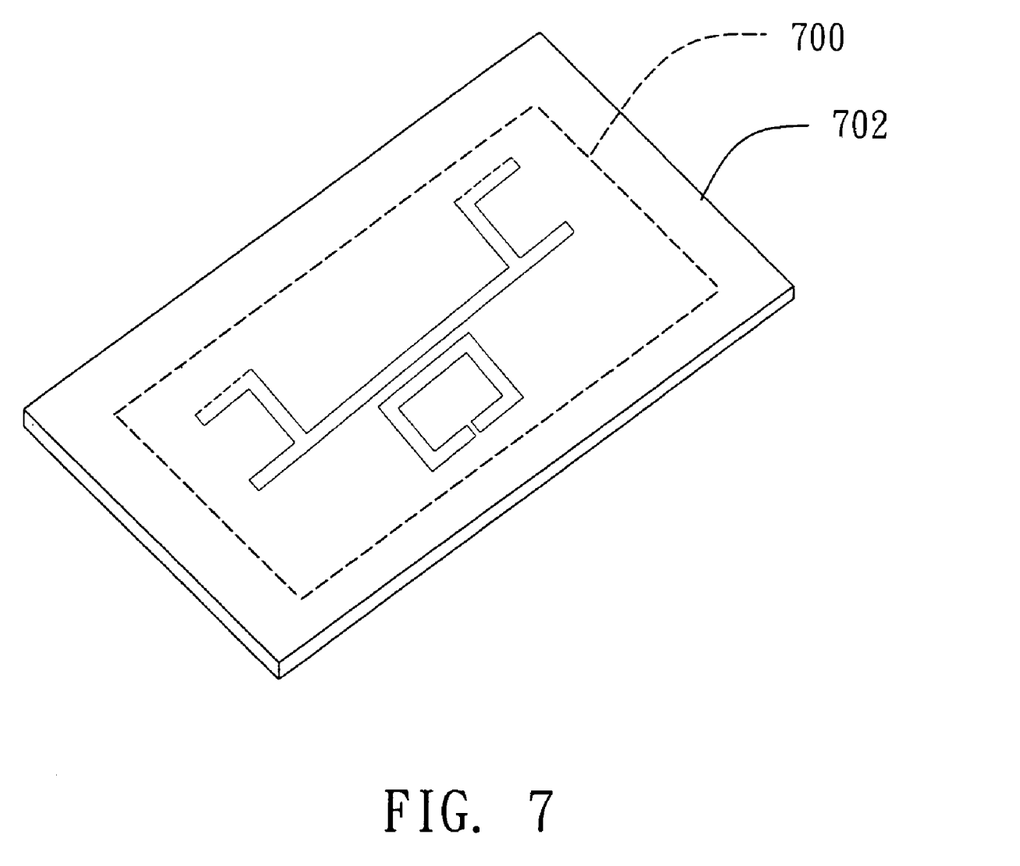
FIG. 7 is a schematic diagram of application of the broadband antenna according to the preferred embodiment of the invention.

The broadband antenna disclosed by the invention can be applied to the RFID system to have an impedance conjugate match of the broadband tag antenna and tag chip and improve the read distance of the reader. Besides, the invention can also be applied to any other type of antenna to increase its antenna bandwidth for receiving RF signals. The broadband antenna can also be applied to a cryptographic card and an identification card. Referring to FIG. 7, a schematic diagram of application of the broadband antenna according to the preferred embodiment of the invention is shown. The broadband antenna 700 is attached to a material board 702, such as a cryptographic card or an identification card. The reader can easily read data stored in the chip (not shown in the figure) of the material board 702 via the broadband antenna 700.

While the invention has been described by way of example and in terms of a preferred embodiment, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A broadband antenna, comprising:
   a coupling loop, having a first feed-in terminal and a second feed-in terminal;
   a first radiation body, being a main body and forming a first resonance loop with the coupling loop; and
   a second radiation body, comprising two L-shaped bodies respectively and symmetrically connected to the main body at distances away from ends of the main body as branches and forming a second resonance loop with the coupling loop;

wherein the first resonance loop provides a first resonance frequency of the broadband antenna, and the second resonance loop provides a second resonance frequency of the broadband antenna;

wherein the coupling loop feeds in signals according to the first resonance frequency and the second resonance frequency;

wherein the coupling loop is separated from the first radiation body and the second radiation body.

2. The broadband antenna according to claim 1, wherein the broadband antenna is a tag antenna.

3. A broadband antenna, comprising:

a coupling loop, having a first feed-in terminal and a second feed-in terminal; and more than two radiation bodies, one of the radiation bodies being a main body, the other radiation bodies being connected in series to each other and forming two brush-shaped bodies symmetrically connected to the main body at distances away from ends of the main body as branches, the radiation bodies respectively forming a plurality of resonance loops with the coupling loop;

wherein each of the resonance loops provides a corresponding resonance frequency;

wherein each of the other radiation bodies comprises two L-shaped bodies;

wherein the coupling loop is separated from the radiation bodies;

wherein the coupling loop feeds in signals according to the resonance frequencies.

4. The broadband antenna according to claim 3, wherein the broadband antenna is a tag antenna.

* * * * *